Patented Dec. 9, 1952

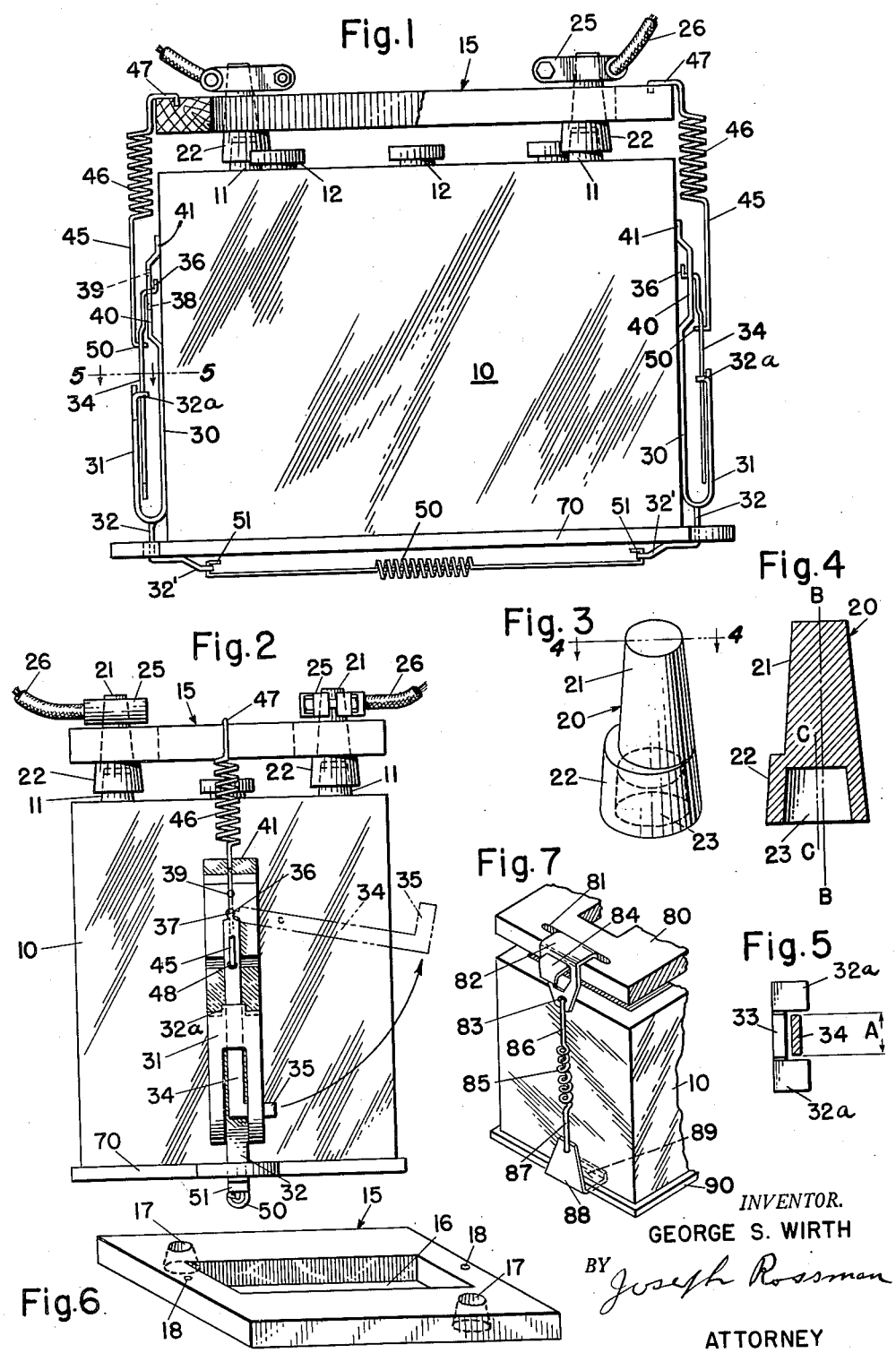

2,621,222

UNITED STATES PATENT OFFICE 2,621,222

BATTERY TERMINAL CONNECTOR

George S. Wirth, Wausau, Wis.

Application August 29, 1949, Serial No. 112,977

4 Claims. (Cl. 136—171)

This invention relates to a battery terminal connector construction. More specifically, the invention relates to easily disengageable means for connecting the terminals of a storage battery of the type used in automobiles so as to eliminate corrosion of the terminals. My invention also lengthens the life of the battery by holding the battery or groups of cells securely in position during use.

In accordance with my invention I provide a cover plate which is suitably retained or held down on the top of a conventional lead storage battery by means of spring activated linkages or clips positioned at opposed sides of the battery. The cover plate is provided with suitable openings for receiving and retaining a pair of metal battery terminal connectors which are adapted to be positioned in electrical contact with the terminals or posts of the battery. The battery terminal connectors in turn are connected to cables by conventional clamps. The cover plate can be quickly disengaged from the top of the battery by releasing the hold down clamps or linkages which engage the cover plate. When the cover plate is removed it carries with it the pair of battery terminal connectors and cables connected thereto so that ready access may be had to the battery itself.

Further advantages and details of my invention will be apparent from the following specification and appended drawing, wherein Figure 1 is a side elevational view, partly in section, of a storage battery assembly provided with a top cover plate and hold-down spring actuated clips or linkages constructed in accordance with my invention, Figure 2 is an end elevational view of the battery assembly shown in Figure 1, Figure 3 is a perspective view of one of the metal battery terminal connectors, Figure 4 is a sectional view taken on lines 4—4 of Figure 3, Figure 5 is a sectional view taken on lines 5—5 of Figure 1, Figure 6 is a perspective view of the cover plate, and Figure 7 is a fragmental perspective view of a modified construction for retaining the cover plate.

Referring to Figures 1 to 6, numeral 10 indicates a conventional lead storage battery having posts or terminals 11 and closure caps 12 in the individual cells for replenishing the individual cells with water. A cover plate 15 of suitable dimensions, as shown in Figure 6, is provided, so as to be coextensive in area with the top of the battery. The cover plate may be made of any suitable non-conducting material, such as wood, plastic, glass, rubber or synthetic materials. The cover plate is provided with two tapered holes 17 which are adapted to receive the upper conical portion 21 of a metal connector 20, shown in Figure 3. The holes 17 are suitably positioned and spaced in the plate 15 so that the bottom portion 22 of the connector extending beneath the plate 15 will be positioned on the battery posts 11, as shown in Figures 1 and 2.

The terminal connectors 20 are made preferably of a lead and antimony alloy or other suitable soft metal composition. As shown in Figures 3 and 4, the terminal connectors are formed so as to have an upper frustoconical portion 21 and a lower frustoconical base portion 22. The central vertical axis of the upper frustoconical portion is indicated by line B—B in Figure 4 and the central vertical axis of the lower frustoconical portion 22 is indicated by line C—C in Figure 4 which is slightly offset from the axis B—B for a purpose hereinafter explained. The under side of the lower frustoconical portion 22 is provided with a downwardly tapered cylindrical bore or hole 23 of suitable dimensions so as to snugly receive the upper ends of the posts or terminals 11 of the battery to form a tight fit.

The holes 17 in the cover plate 15 are so located that the axis B—B of the terminal connector 20 will coincide with the axis of the battery posts 11. The axis B—B of the tapered bore or hole 23 will therefore be in off-center relation to the axis of the post 11. Any variations in the distance between the posts 11 can be compensated by merely rotating the terminal connectors 20 to a sufficient degree in their retaining holes 17 of the cover plate 15. It will also be noted in Figures 1 and 2 that there is a small space between the top of the tapered hole 23 to allow for normal wear when changing batteries as well as a place for lubrication.

The cover plate may be provided if desired with a suitable opening 16, as shown in Figure 6, so that access may be had to the caps or closures 12 for inspecting the battery and replenishing water in the individual cells of the battery.

The cover plate 15 is retained on the battery by means of a pair of linkages and springs positioned at opposed ends of the battery, as shown in Figure 1. The cover plate is provided at each end with a suitable recess or depression 18 to receive the end 47 of a spring 46. The other end 50 of the spring is engaged in opening 49 in hinged lever 34. The spring 46 may be coated or enclosed with a suitable material such as rubber or synthetic plastics to protect it against corrosion and rust. The lever 34 is provided with a terminal portion 36 which is inserted in an opening 37 in U-saped bar 30.

The bar 30 is formed to have a raised portion 40 adjacent its flat end portion 41 which rests on the end walls of the battery 10. A suitable number of auxiliary spaced openings 39 are provided in the raised portion 40 in which the terminal portion 36 of lever 34 may be selectively inserted so as to adjust the length of the hold down linkage to different heights of the battery as well as to adjust the tension of spring 46. The lower end of the U-shaped bar 30 has an extension 32 which projects through an opening in the supporting pan or carrier 70 on which the battery 10 is positioned. The ends 32' of the extensions 32 are adapted to be engaged by the ends 51 of a spring 50 positioned beneath the pan 70. The leg portion 31 of bar 30 is provided at its upper free end with spaced ears 32a at each side thereof, as shown in Figure 5. The inner space between the ears 32 is slightly greater in length than the width A of link 34 so that link 34 is adapted to be received between the ears 32 and retained therebetween.

In using the described construction, when it is desired to disconnect the connectors 20 from the battery posts 11, the hinged lever 34 is first moved slightly to the right of the ears 32a shown in Figure 5 so as to be disengaged therefrom. The lever 34 is then hinged upwardly to the position shown by the dotted lines in Figure 2. The tension of spring 46 is thereupon sufficiently reduced so that the ends 47 of springs 46 can be readily disengaged and removed from the recesses 18 in the cover plate 15. The cover plate 15 can then be lifted from the top of the battery carrying with it the connectors 20 and attached cables 26, which are retained on connectors 20 by clamps 25.

When it is desired to assemble the cover plate 15 and connectors 20 on the battery, the plate 15 is merely positioned on the top of the battery so that the battery posts 11 are received in the cylindrical bores 23 of the connectors 20 to make electrical contact therewith. The ends 47 of springs 46 are then inserted in the recesses 18 of plate 15. The lever 35 is then rocked downwardly to assume the locked position shown in Figures 1 and 2.

A modified construction of my invention is shown in Figure 7, wherein the cover plate 80 is retained on the top of battery 10 by means of an upper metal plate 82 which has a lip portion received in recess 81 of the plate 80. The plate 82 is provided with an integral ear portion 84 for lifting the plate 82 manually when it is desired to disengage it from the top cover plate 80. An opening 83 is provided in plate 82 for receiving one end 86 of spring 85. The other end 87 of the spring is received in a lower metal plate 88 which engages the pan 90 on which the battery rests. The lower plate 88 has an inwardly extending lip portion 89 which engages the bottom of the pan 90. The cover plate 80 is provided with spaced openings for receiving connectors 20 in the same manner as described in connection with the cover plate 15 shown in Figure 1 for making electrical contact with the posts of the battery. When it is desired to disconnect the connectors the plate 82 is merely lifted manually by pulling upwardly on the ears 84 so as to disengage the plates 82 from the cover plate 80. The cover plate can then be lifted from the battery while carrying the connectors and attached cables.

It is to be understood that numerous changes and modifications may be made in the specific embodiments of my invention herein disclosed which are intended to be covered by the appended claims.

I claim:

1. In combination with a storage battery having spaced terminal posts, a support for said battery, a removable cover plate retained on said battery, spring actuated links connecting said cover plate and support, and spaced terminal connectors carried by said cover plate and in electrical contact with said terminal posts, each of said links comprising a U-shaped bar, the lower ends of said bars extending beneath said support and connected by a spring, a lever pivoted to said U-shaped bar, one end of a spring connected to said pivoted lever and the other end of said spring connected to the cover plate.

2. In the combination of a storage battery having spaced posts, a support for said battery, and a removable cover plate on said battery, spaced terminal connectors on said cover contacting said spaced posts, means for retaining said cover plate comprising a U-shaped bar having a body portion and a leg portion, a lever hinged to said body portion, means on said leg portion for retaining said lever, and a spring having one end connected to the said cover plate and the other end connected to said hinged lever.

3. A battery connector element comprising a frustoconical body portion and a frustoconical base portion integral therewith and extending directly beneath said body portion, said base portion being bored internally with a downwardly tapered bore for snugly receiving the terminals of a battery, said bore being offset with respect to the vertical axis of the said body portion.

4. A battery connector element comprising a frustoconical body portion and a frustoconical base portion integral therewith and extending directly beneath said body portion, the vertical axis of said base portion being offset from the vertical axis of said frustoconical body portion, said base portion being bored internally with a downwardly tapered bore for snugly receiving the terminals of a battery, said bore being offset with respect to the vertical axis of the said body portion.

GEORGE S. WIRTH.

REFERENCES CITED

The following references are of record in the file of this patent:

UNITED STATES PATENTS

| Number | Name | Date |
|---|---|---|
| 872,213 | Bailey | Nov. 26, 1907 |
| 1,392,757 | Gales | Oct. 4, 1921 |
| 1,421,017 | Lundberg | June 27, 1922 |
| 1,542,821 | Bohannon | June 23, 1925 |
| 1,952,150 | Trimble et al. | Mar. 27, 1934 |
| 1,993,893 | Page, Jr. | Mar. 12, 1935 |
| 2,439,464 | Good | Apr. 13, 1948 |
| 2,456,246 | Berg et al. | Dec. 14, 1948 |

FOREIGN PATENTS

| Number | Country | Date |
|---|---|---|
| 232,734 | Switzerland | Sept. 1, 1944 |
| 298,744 | Great Britain | Oct. 18, 1928 |
| 399,882 | Great Britain | Oct. 16, 1933 |
| 761,404 | France | Jan. 5, 1934 |